US010225629B2

(12) United States Patent
Lam et al.

(10) Patent No.: US 10,225,629 B2
(45) Date of Patent: Mar. 5, 2019

(54) SYSTEM FOR MONITORING CONDITION OF ADJUSTABLE CONSTRUCTION TEMPORARY SUPPORTS

(71) Applicants: Chi Hung Louis Lam, Hong Kong (HK); Chun Yu Ronald Lam, Hong Kong (HK)

(72) Inventors: Chi Hung Louis Lam, Hong Kong (HK); Chun Yu Ronald Lam, Hong Kong (HK)

(*) Notice: Subject to any disclaimer, the term of this patent is extended or adjusted under 35 U.S.C. 154(b) by 369 days.

(21) Appl. No.: 14/088,807

(22) Filed: Nov. 25, 2013

(65) Prior Publication Data
US 2015/0144762 A1 May 28, 2015

(51) Int. Cl.
H04Q 9/00 (2006.01)
G01M 5/00 (2006.01)
(Continued)

(52) U.S. Cl.
CPC ............. H04Q 9/00 (2013.01); E04G 25/04 (2013.01); E04G 25/065 (2013.01); G01L 1/22 (2013.01);
(Continued)

(58) Field of Classification Search
CPC ...... G01L 1/2218; G01L 5/00; G01M 5/0041; G01M 5/0025; G01M 5/0033;
(Continued)

(56) References Cited

U.S. PATENT DOCUMENTS 2,403,951 A * 7/1946 Ruge .................. G01L 1/2218
33/DIG. 13
2,980,414 A * 4/1961 Perry, Jr. ............ G01G 3/1402
177/208
(Continued)

FOREIGN PATENT DOCUMENTS

CA 2033542 C * 12/2001 ............... E04G 7/14
CA 2685610 A1 11/2008
(Continued)

OTHER PUBLICATIONS

Second Office Action, dated Sep. 14, 2017, The Patent Office of the State Intellectual Property Office of the People's Republic of China, Patent application 201380081968.5 titled A System for Monitoring Condition of Adjustable Construction Temporary Supports (Includes translation).
(Continued)

Primary Examiner — Muhammad Ijaz
Assistant Examiner — Taylor L Morris
(74) Attorney, Agent, or Firm — Craig A. Fleschko, Esq.; DeWitt LLP

(57) ABSTRACT

A system for adjustable construction or demolition temporary supports is disclosed. The adjustable construction or demolition temporary support includes a plurality of sensor devices for measuring load on the support and signal detection and communication device that being in communication with the sensor devices. The communication device further comprises a display unit and/or audio output unit for providing visual and/or audible alarm for alarming conditions. The signal detection and communication device further includes a wireless transceiver for remote monitoring.

14 Claims, 13 Drawing Sheets

(51) Int. Cl.
*G01L 5/00* (2006.01)
*G01L 1/22* (2006.01)
*E04G 25/06* (2006.01)
*E04G 25/04* (2006.01)
*E02D 33/00* (2006.01)
*E04G 23/08* (2006.01)
*E04G 5/16* (2006.01)

(52) U.S. Cl.
CPC ............ *G01L 1/225* (2013.01); *G01L 1/2218* (2013.01); *G01L 1/2281* (2013.01); *G01L 5/00* (2013.01); *G01M 5/0041* (2013.01); *G01M 5/0058* (2013.01); *E02D 33/00* (2013.01); *E04G 5/16* (2013.01); *E04G 23/08* (2013.01); *G01M 5/0025* (2013.01); *G01M 5/0033* (2013.01); *H04Q 2209/40* (2013.01); *H04Q 2209/823* (2013.01)

(58) Field of Classification Search
CPC ........ G01M 5/0058; G01B 7/16; E02D 33/00; E04G 25/065; E04G 25/04
USPC ...... 73/761, 786, 849, 862.474; 52/1, 122.1, 52/126.1, 126.6; 338/2; 248/200.1, 248/354.6, 542
See application file for complete search history.

(56) References Cited

U.S. PATENT DOCUMENTS

| | | | | |
|---|---|---|---|---|
| 3,090,226 A * | 5/1963 | Corti | ................ | A61B 5/1102 340/870.06 |
| 3,199,057 A * | 8/1965 | Gindes | ................ | G01L 1/2231 338/36 |
| 3,520,182 A * | 7/1970 | Zeltkalns | ............. | G01L 1/2231 73/862.55 |
| 4,047,427 A * | 9/1977 | Young | ................ | B23Q 1/0054 177/144 |
| 4,079,624 A * | 3/1978 | Kurtz | ................ | G01L 1/2218 73/781 |
| 4,135,392 A * | 1/1979 | Young | ................ | B23Q 1/0054 177/211 |
| 4,377,800 A * | 3/1983 | Fuld | ................ | G01B 7/16 338/2 |
| 4,423,793 A * | 1/1984 | Caris | ................ | G01L 1/2218 177/211 |
| 4,793,189 A * | 12/1988 | Dell'Orto | ............ | G01B 7/20 73/775 |
| 4,846,436 A * | 7/1989 | Young | ................ | F16M 7/00 248/188.4 |
| 4,876,895 A * | 10/1989 | Kao | ................ | E02D 1/00 73/761 |
| 4,932,253 A * | 6/1990 | McCoy | ............. | E21B 47/0006 73/152.61 |
| 5,259,690 A * | 11/1993 | Legge | ................ | E04G 7/14 24/270 |
| RE34,686 E * | 8/1994 | Coyle, Jr. | ............ | B23P 19/066 73/761 |
| 5,590,863 A * | 1/1997 | Sasaki | ................ | E04G 17/14 248/354.3 |
| 5,634,619 A * | 6/1997 | Alessi | ................ | A47B 57/565 248/219.3 |
| 5,983,729 A * | 11/1999 | Taylor | ................ | G01L 5/0061 73/849 |
| 6,127,926 A * | 10/2000 | Dando | ............. | G08B 13/2491 340/522 |
| 6,318,185 B1 * | 11/2001 | Aumard | ............ | G01L 1/2218 73/790 |
| 6,394,405 B1 * | 5/2002 | Roxton | ............ | E04G 25/04 248/354.1 |
| 6,434,893 B1 * | 8/2002 | Quenzi | ............ | E04G 11/48 52/1 |
| 7,331,226 B2 * | 2/2008 | Feldman | ........... | A63B 21/0023 73/379.01 |
| 7,496,454 B2 * | 2/2009 | Rogers | .............. | G01M 5/0025 702/33 |
| 7,559,254 B2 * | 7/2009 | Fowler | .............. | G01B 7/16 73/786 |
| 7,584,932 B2 * | 9/2009 | Shih | .............. | E04G 17/14 248/125.2 |
| 8,024,980 B2 * | 9/2011 | Arms | .............. | G01L 1/2225 73/761 |
| 8,215,178 B2 * | 7/2012 | Saigh | .............. | G01B 7/16 73/775 |
| 8,298,293 B2 * | 10/2012 | Leydet | .............. | A61F 2/68 623/24 |
| 8,713,891 B2 * | 5/2014 | Carr | .............. | E04G 23/0218 405/211.1 |
| 9,027,898 B1 * | 5/2015 | Holmboe | .............. | E04G 25/065 248/354.4 |
| 2002/0079165 A1 * | 6/2002 | Wolfe | .............. | E04G 5/10 182/186.7 |
| 2002/0139910 A1 * | 10/2002 | Shih | .............. | E04G 25/06 248/200.1 |
| 2003/0089049 A1 * | 5/2003 | Scissom | .............. | E04F 15/02452 52/126.1 |
| 2003/0170108 A1 * | 9/2003 | Hummer | .............. | B66F 9/082 414/662 |
| 2003/0178253 A1 * | 9/2003 | Tatge | .............. | E04G 1/14 182/132 |
| 2007/0151356 A1 * | 7/2007 | Sumigawa | .............. | G01B 7/16 73/777 |
| 2008/0087097 A1 * | 4/2008 | Nagata | .............. | G01L 1/2287 73/761 |
| 2008/0255806 A1 * | 10/2008 | Sambuelli | .............. | G01M 5/0025 702/183 |
| 2008/0267692 A1 * | 10/2008 | Soderlund | .............. | B23B 31/204 403/5 |
| 2009/0101774 A1 * | 4/2009 | Shih | .............. | E04G 17/14 248/200.1 |
| 2009/0301176 A1 * | 12/2009 | Rowe | .............. | B82Y 35/00 73/64.53 |
| 2010/0215493 A1 * | 8/2010 | Abdallah | .............. | F03D 7/0232 416/23 |
| 2011/0088489 A1 * | 4/2011 | Yamamoto | .............. | G01L 1/2218 73/862.627 |
| 2011/0097180 A1 * | 4/2011 | Bastone | .............. | E04G 25/04 414/10 |
| 2011/0162465 A1 * | 7/2011 | Pekin | .............. | A01K 77/00 73/862.474 |
| 2011/0178730 A1 * | 7/2011 | Mangal | .............. | E21B 17/017 702/43 |
| 2011/0179863 A1 * | 7/2011 | Becker | .............. | G01M 13/028 73/460 |
| 2013/0043053 A1 * | 2/2013 | Malorni | .............. | B25B 13/50 173/216 |
| 2013/0126249 A1 * | 5/2013 | Buttolph | .............. | G01L 1/2218 177/211 |
| 2013/0146825 A1 * | 6/2013 | Buckingham | ......... | E04G 25/061 254/105 |
| 2014/0007702 A1 * | 1/2014 | Kluge | .............. | G01L 19/14 73/862.541 |
| 2014/0149016 A1 * | 5/2014 | Basu | .............. | G01M 5/0025 701/102 |
| 2014/0283617 A1 * | 9/2014 | Hsieh | .............. | G01L 5/00 73/761 |
| 2017/0003118 A1 * | 1/2017 | Hashimoto | .............. | G01B 11/16 |
| 2017/0275994 A1 * | 9/2017 | Moye | .............. | E04G 25/04 |

FOREIGN PATENT DOCUMENTS

| | | |
|---|---|---|
| CN | 2308671 Y | 2/1999 |
| CN | 101680753 A | 5/2007 |
| CN | 101603864 A | 6/2009 |
| CN | 201561826 U | 10/2009 |
| CN | 102087151 A | 11/2010 |
| CN | 102997896 A | 3/2013 |
| DE | 2802176 A1 * | 7/1979 ........... G01L 1/2218 |

(56) References Cited

FOREIGN PATENT DOCUMENTS

| DE | 3631647 | A1 | * | 3/1987 | ............... G01B 7/20 |
|----|---------|----|----|--------|---------------------------|
| DE | 102010027890 | A1 | * | 12/2011 | ............... E04G 5/02 |
| EP | 0176173 | A2 | * | 4/1986 | ........... G01L 1/2218 |
| EP | 0800069 | A1 | * | 10/1997 | ........... G01G 3/1408 |
| FR | 2247102 | A5 | * | 5/1975 | ............... E04G 1/14 |
| GB | 483150 | A | * | 4/1938 | ............... E04G 7/02 |
| GB | 626206 | A | * | 7/1949 | ........... G01L 1/2218 |
| GB | 634889 | A | * | 3/1950 | ............. E04B 1/585 |
| GB | 708392 | A | | 5/1952 | |
| GB | 708392 | | | 5/1954 | |
| GB | 934915 | A | * | 8/1963 | ............... E04G 7/02 |

OTHER PUBLICATIONS

Notice of Grant of Patent Right for Invention, dated Jun. 26, 2018, The State Intellectual Property Office of The People's Republic of China, patent application 201380081968.5 titled A system for Monitoring Condition of Adjustable Construction Temporary Supports (Includes Translation).

* cited by examiner

(12) United States Patent
US 10,225,629 B2

SYSTEM FOR MONITORING CONDITION OF ADJUSTABLE CONSTRUCTION TEMPORARY SUPPORTS

CROSS-REFERENCE TO RELATED APPLICATIONS

Not Applicable

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

REFERENCE TO A "SEQUENCE LISTING"

Not Applicable

BACKGROUND OF THE INVENTION

Field of the Invention

The present invention generally relates to a support prop with a sensor for construction or demolition works. It further relates to support props with sensor devices for forming a network therebetween. It yet further relates to a method of monitoring and adjusting a load present on each support prop and the distribution of the loading among the support props.

Description of Related Art

Use of temporary support systems is indispensable during demolition or construction, erection of buildings and engineering structures. During construction stage, for example, temporary support systems built up from props are widely used to provide a support structure for newly formed concrete floors, decks, etc. Before a freshly poured concrete floor or deck has gain sufficient strength to support its own weight and any imposed loading, the weight of the formwork and concrete are transferred to either the floor below or to the ground by a propping system. Temporary support props are also used to support structural components which have not yet been fully connected or secured.

On the other hand, for demolition works that are adopting the mechanical top down approach, for example, temporary propping systems are installed at the inter-floor spaces in between several consecutive floors to distribute, among the propped floors, the gravity load of heavy demolition machinery operating on the top floor among the propped floors.

Owing to the complexity of site and environmental conditions, the exact/actual loading carried by each individual prop in a temporary load supporting system is usually unknown. The actual distribution of the load depends also largely on the initial load that is applied to each prop during installation and initial set up; however, the initial load has never been checked or monitored owing to the lack of suitable instrument or equipment.

At present, there is not any site viable device or system which is cost effective enough to facilitate regular or continuous monitoring of the load on each prop. In most cases, the design of a propping system is based on either rule of thumb or general past experiences. These uncertainties, when combined with other adverse factors, have led to numerous severe and disastrous failures or accidents.

Currently, the load on a prop may only be measured by placing a load cell/weight sensor at one of the distal ends of the prop. The electrical signal from the load cell has to be connected to a process meter to display the magnitude of the load in force units. The load cell and the process meter have to be calibrated together as a combined set before used to take measurements. Once calibrated, the combination cannot be changed among different load cells and process meters. Power cable and signal transmission cable have to be installed between the process meter and the monitoring station. Thus, the cost of measurement and/or monitoring load on props is very high. The use of cables for signal transmission creates a lot of inconvenience at the construction site and may even become safety hazards. These short comings prevent existing techniques to be applied efficiently for massive data gathering and monitoring.

Thus, there is a need to enhance current equipment to improve safety and effectiveness of the monitoring load on props in a propping system. There further exists a need for a new temporary support propping system with prop forces under monitoring, and with overload warning capabilities in the construction industry.

BRIEF SUMMARY OF THE INVENTION

An object of the present patent application is to provide a practical temporary load support system or propping system, which consists of one or more adjustable props, comprises sensors for monitoring the load on each prop in order to control the load so as to achieve the desirable and proper load distribution.

Another object of the present patent application is to provide a detachable signal detection and communication device to work in combination with a sensor device that is permanently attached on the prop and to wirelessly transmit and receive loading information and command signals to and from a central monitoring station.

Yet another object of the present patent application is to provide a monitoring network with communication devices to establish a comprehensive network for transmission and reception of load data/information and command signals to and from a central monitoring/control station.

Yet another object of the present patent application is to provide a monitoring system to provide real time information on the loading conditions of the supporting props during construction or demolition periods such that warning and alarm signals can be issued to alert construction workers of the potential danger of structural failure when the load bearing capacity of the supporting prop or props are exceeded.

Yet another object of the present patent application is to provide a monitoring system assuring that the props are adjusted to the proper designed load to achieve the desirable load distribution during demolition.

Yet another object of the present patent application is to provide a monitoring system which can assure that the props are adjusted to provide proper support for construction of concrete flooring or decking. Proper propping and re-propping at construction stage will prevent premature loading on concrete flooring while the concrete is still gaining strength and thus can avoid impairment to the final strength of the structural floor.

According to one embodiment of the present patent application, it provides a temporary support prop system having sensor or sensors attached to the prop to provide load and relevant information to a signal detection and communication device. The signal detection and communication devices are connected in a network and information on the prop is relayed to a master control or central monitoring device. The central monitoring device can then inform the user of the system about the current status of the temporary support system with regards to the load or force in each support member. Based on the information on the magnitude of the force, or magnitudes of forces, the user can carry out field adjustment of the force in each prop appropriately. The central monitoring device can also issue alarm signals or send alert commands to the signal detection and communication devices to raise alarms should conditions on the temporary support prop system exceed preset ranges. Alarm signals from the signal detection and communication device can provide life saving time for workers to evacuate should the temporary support system becomes overloaded or unstable. Alternatively, the central monitoring device can issue command to a separate warning system at the affected area to call for evacuation.

The present invention may be best understood and will become apparent from the following description with referencing to the accompanying drawings.

DETAILED DESCRIPTION OF THE INVENTION

Figure 1A:
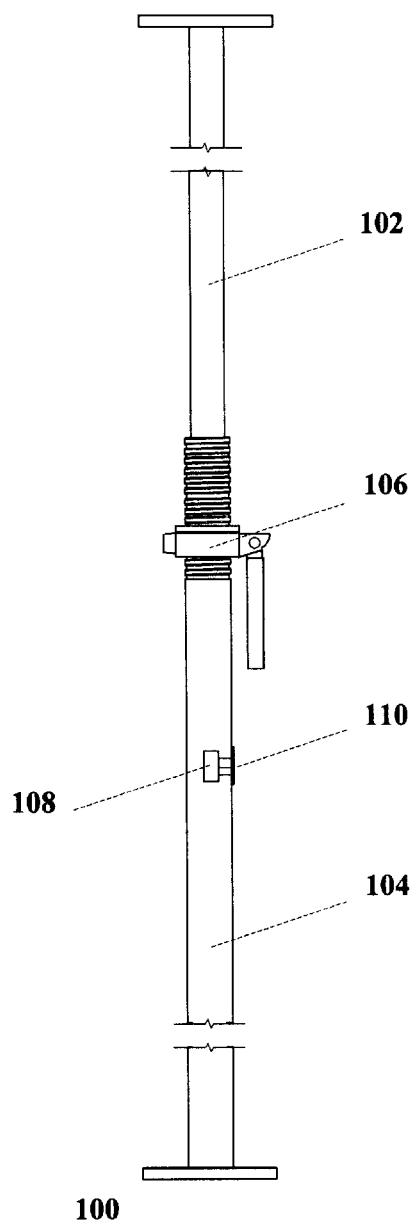
FIG. 1a shows a front elevation view of a telescopic prop 100 of a preferred embodiment of the present invention.
Figure 1B:
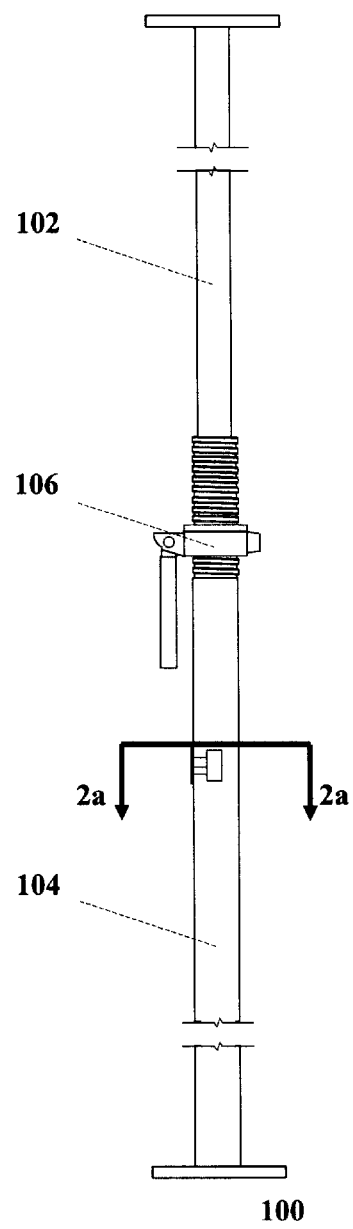
FIG. 1b shows a rear elevation view of the telescopic prop 100
Figure 2A:
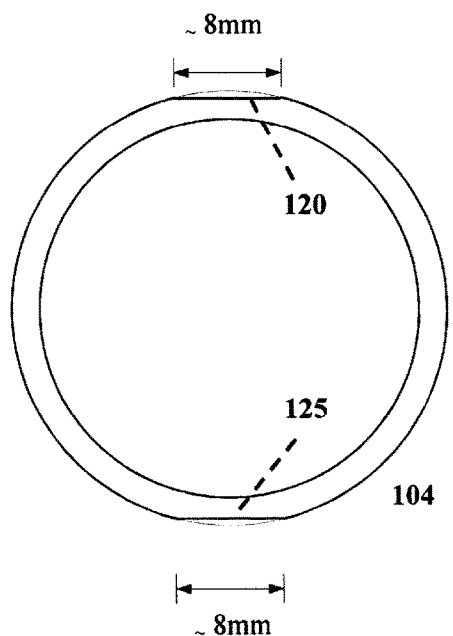
FIG. 2a shows a cross-sectional top view of the second tubular section 104 thereof, shown 2a-2a in FIG. 1.
Figure 2B:
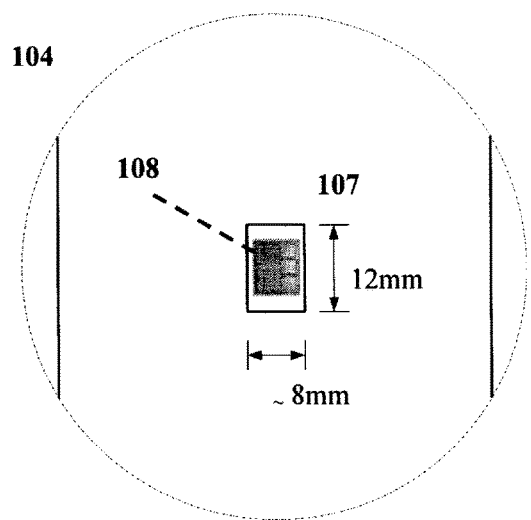
FIG. 2b shows a front elevation view of a portion of the second tubular section 104 thereof.
Figure 2C:
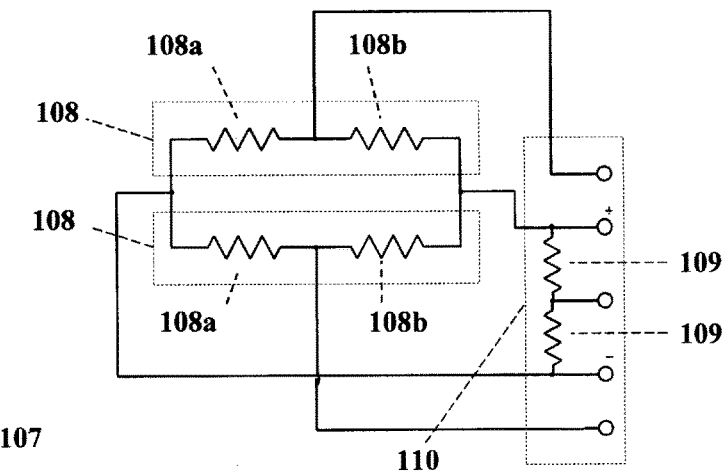
FIG. 2c shows a schematic view of the electrical circuit diagram of a sensor device 107 of a preferred embodiment of the present invention.

FIG. 1a shows a front elevation view of a telescopic prop 100 consisting of at least two members, a first tubular section 102 and a second tubular section 104 which are joined together in such a way that the first tubular section 102 operably engages with the second tubular section 104 so that the height of the prop 100 can be changed and adjusted. FIG. 1b shows a rear view thereof. Adjustment to the height and loading of the telescopic prop 100 is provided by a releasable fastener 106. The releasable fastener 106 may comprises an actuator, for example, a jackscrew mechanism. The actuator provides means for fine adjustment to the height and capability to further adjust the length for balancing the applied load to the prop 100. Sensor device 108, which measures the magnitude of the load on the prop 100, is attached to two or more selected positions of the prop 100. In the preferred embodiment of the present invention, two sensor devices 108 are placed/positioned at diametrically opposite positions as shown in FIG. 2a, which are at the same longitudinal distance from the bottom (or top) end of the prop 100. Yet, in another preferred embodiment of the present invention, three or more sensor devices 108 may also be attached/placed thereto at radially symmetric positions, which are at the same longitudinal distance from the bottom (or top) end of the prop 100. A typical electric circuit diagram for the connections between the sensor devices 108 and the connector 110 is shown in FIG. 2c. Electric power to energize the sensor devices 108 is supplied from a battery source (not shown) via the two connection pins, which are preferably labeled with the + and − marks respectively, of the connector 110 shown in FIG. 2c. Signal lines from the sensor devices 108 are respectively connected to at least two pins, for example, the top and bottom connection pins of the connector 110 as shown in FIG. 2c.

FIG. 2a shows a cross-sectional top view of the second tubular section 104 thereof, shown 2a-2a in FIG. 1. In a preferred embodiment of the present invention, two diagonally opposites lateral sides 120 and 125 of the second tubular section 104, which has an outside diameter of about 60 mm, is milled down in a sufficient depth, for example, about 270 µm±30 µm at the peak for the size of about 8 mm or so width and 7 to 12 mm height to provide a substantially flat surface for receiving or attaching a strain gauge type sensor 108. The load applied to the prop 100 would produce a comprehensive force or strain thereto, and thus the load applied thereto would be measured by a magnitude of the comprehensive strain. In another embodiment of the present invention, the strain gauge type sensors 108 may be placed or positioned on inner surface of the second tubular section 104.

A schematic diagram of the entire sensor device 107 of a preferred embodiment of the present invention is shown in FIG. 2c. The sensor device 107 includes strain gauge type load sensor(s) 108 and two resistor(s) 109 of the same electrical resistance, all electrically connected to the connector 110. The strain gauge type load sensor 108 comprises active strain gauge 108a and dummy strain gauge 108b. As known to a person ordinary skilled in the pertinent art, active strain gauge 108a would changes its resistance value based on the physical strains that it is receiving, by measuring such changes, degree of strain applied thereto may be determined. Dummy strain gauge 108b would provide temperature compensation for the measurement.

Figure 3:
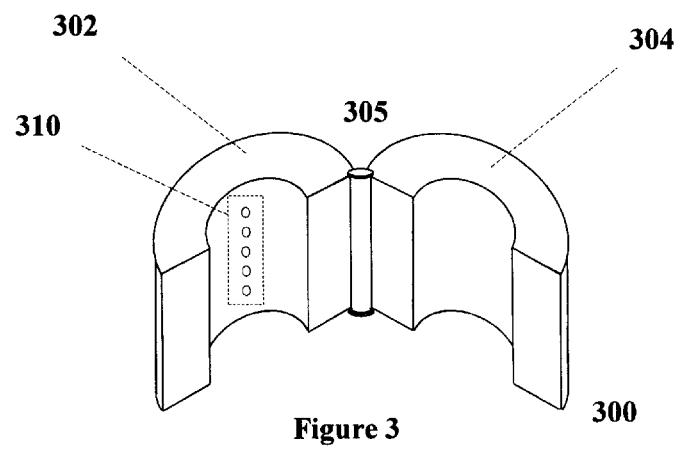
FIG. 3 shows a front perspective view of a detachable combined signal detection and communication device 300, in an open position, of a preferred embodiment of the present invention.
Figure 4:
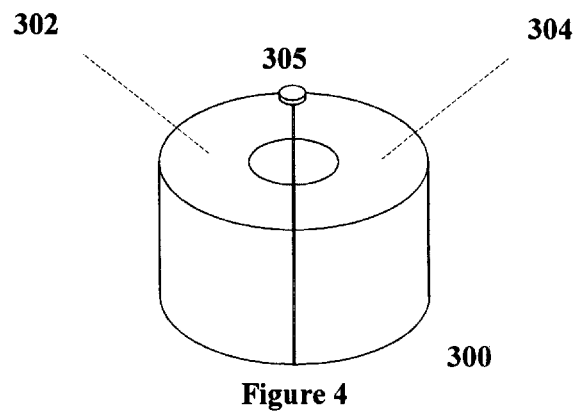
FIG. 4 shows a front perspective view of the detachable combined signal detection and communication device 300 in a closed position.
Figure 10:
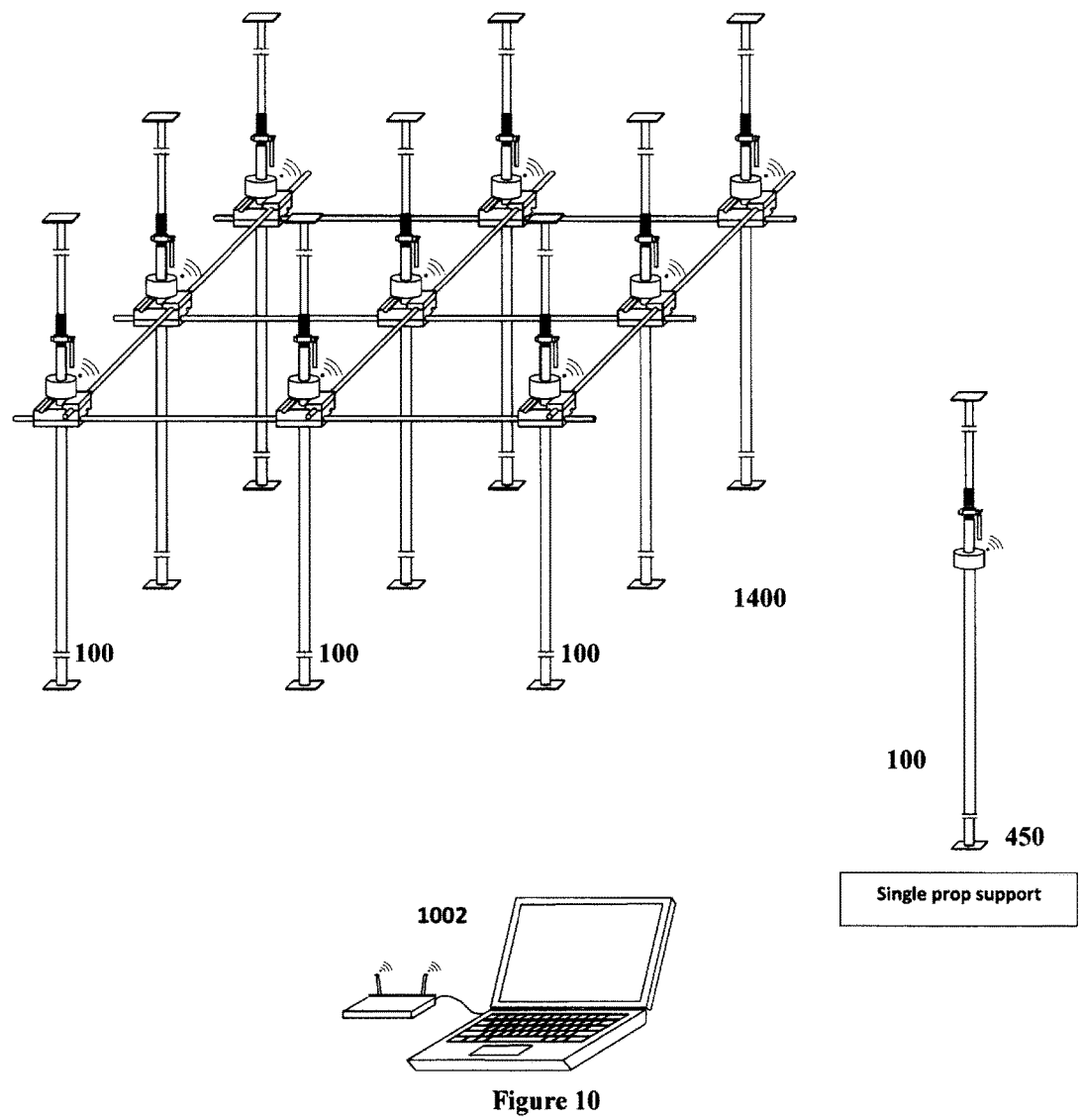
FIG. 10 shows a perspective view of a central monitoring station 1002 in communication with a single telescopic support prop 100 and/or a plurality of telescopic support props in a propping system 1400.

Now referring to FIGS. 3 and 4, a detachable combined signal detection and communication device 300 comprises a signal detection device 302 and a communication device 304. In a preferred embodiment of the present invention, the detachable combined signal detection and communication device 300 has the signal detection device 302 and a communication device 304 operably attached each other by operable attachment or such means 305, such as, for example, hinge, The detachable combined signal detection and communication device 300 further provides a conduit or void, such that, when the detachable combined signal detection and communication device 300 is mounted to the prop 100, the detachable combined signal detection and communication device 300 encloses a portion of the prop 100. As it can be seen, FIG. 3 shows the detachable combined signal detection and communication device 300 in an open position, and FIG. 4 shows the detachable combined signal detection and communication device 300 in a closed position. The detachable signal detection device 302 has a connector 310. Each of the connection pins of the connector 310, when the detachable combined signal detection and communication device 300 is mounted on the prop 100, mates with the corresponding connection pins of connector 110 of the sensor device 107 on the prop 100. Power from a battery (not shown), which is stored inside the detachable signal detection device 302, is transmitted via the mated power connection pins of connectors 310 through the matching connection pins of connector 110 to the sensor devices 107. Load indicating signals from the sensor device 107 are communicated via the mated signal connection pins of connectors 110 and 310 to the detachable signal detection device 302. The detachable signal detection device 302 is further in communication with the detachable communication device 304 for communicating with a remote system. For example, measurement by the detachable combined signal detection and communication device 300 may be communicated with a central monitoring device 1002 as shown in FIG. 10. The detachable communication device 304 provides a means for interfacing a remote system (such as the central monitoring device 1002) through wired communication media/medium or wirelessly. In a preferred embodiment of the present invention, the detachable communication device 304 provides means for wirelessly communicating with the remote monitoring system via, for example, a wireless transceiver such as radio or optical transceiver(s).

The detachable combined signal detection and communication device 300 may further measure inclination (including angle and direction of inclination) of the prop 100, ambient temperature, humidity and/or etc. In a preferred embodiment of the present invention, such detection of these measurements is accommodated by an addition of microelectromechanical systems ("MEMS") integrated circuits into the Signal Detection Device 302. Yet in another embodiment of the present invention, such detection of these measurements is incorporated in a video drive unit 407 shown in FIG. 15. Alarm conditions for these measurements are monitored and controlled by the micro-controller unit 404.

Figure 5:
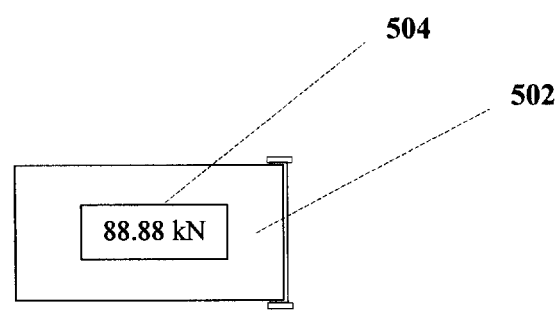
FIG. 5 shows the side view of the detachable combined signal detection and communication device 300 with a digital display unit 504.

FIG. 5 shows another embodiment of the detachable combined signal detection and communication device 502 of the present invention. The detachable combined signal detection and communication device 502 has a display unit (or digital display unit) and/or audio output unit 504 thereon for displaying measurement, control parameter or other information thereon, and/or providing audible alarm. The digital display unit 504 may be a touch-panel display unit for displaying to and receiving input from a user.

Figure 6:
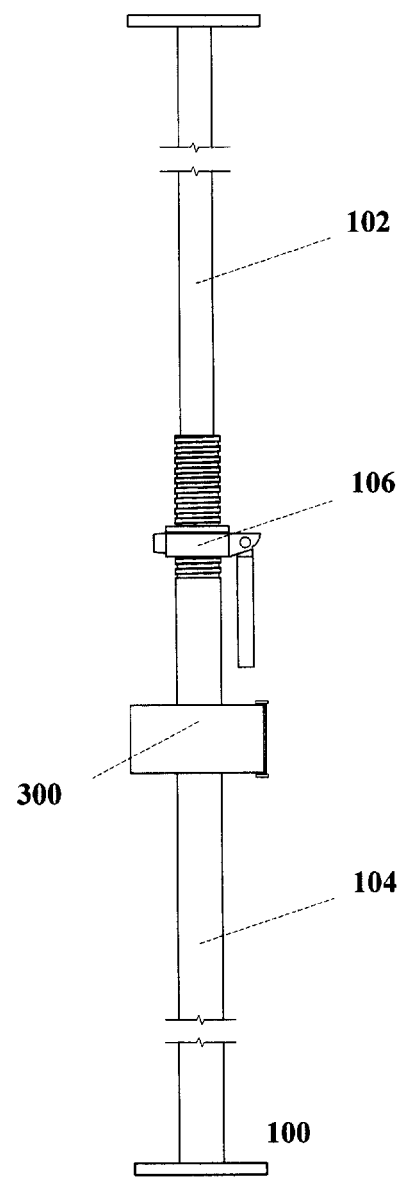
FIG. 6 shows the front elevation view of the telescopic support prop 100 with the detachable combined signal detection and communication device 300 attached thereto.

Referring to FIG. 6, the detachable combined signal detection and communication device 300 (or 502) may be attached to the telescopic prop 100 of the present invention, such that sensed load by the sensor device 107 may be measured and communicated to a remote system (not shown).

Figure 7:
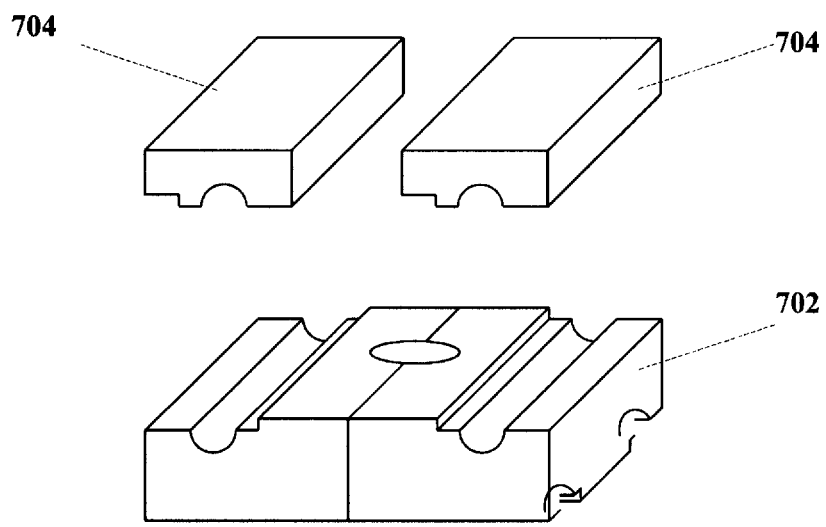
FIG. 7 shows a front perspective view of a lateral restraint member clamping device 702 and lateral restraint member clamping device accessories 704 for the telescopic support prop 100.

Various accessories, such as lateral-restraint member clamping device 702 and its accessories 704 may be used with the telescopic prop 100 for providing lateral support as shown in FIG. 7.

Figure 8:
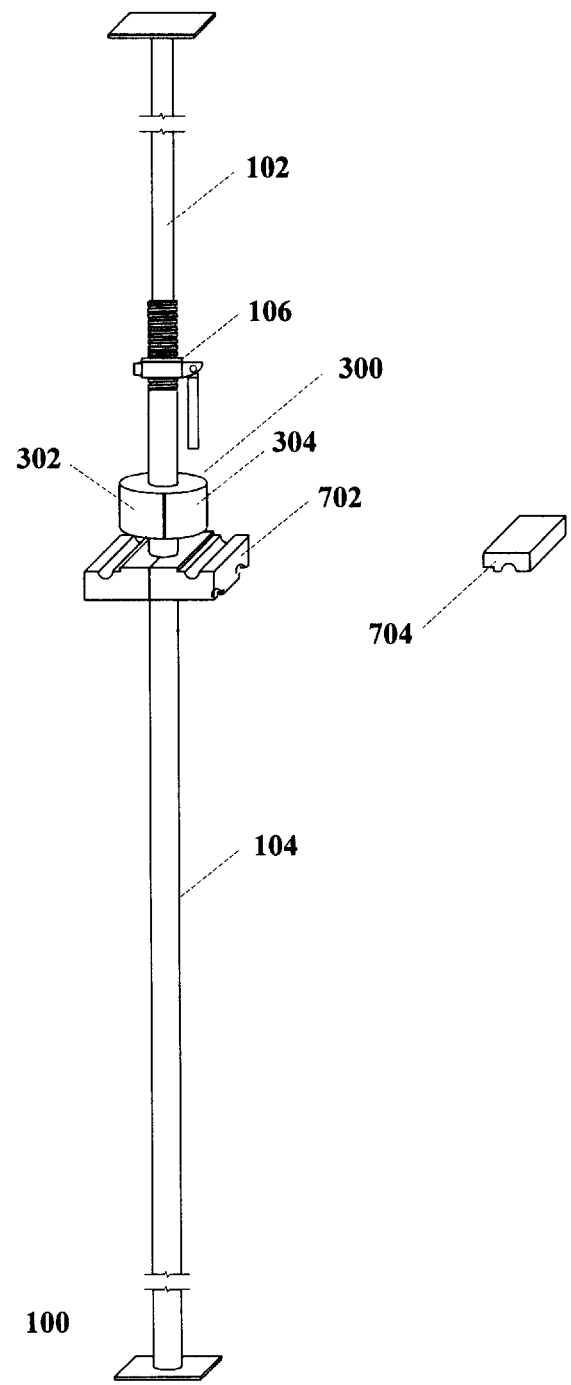
FIG. 8 shows a front perspective view of the telescopic support prop 100 with the detachable combined signal detection and communication device 300, and the lateral restraint member clamping device 702 attached thereto.

For example, referring to FIG. 8, the lateral-restraint member clamping device 702 may be detachably attached to the telescopic prop 100 for providing a base for receiving a lateral-restraint/bar member for building an array of telescopic props 100 to build a multi-prop support 1400.

Figure 9:
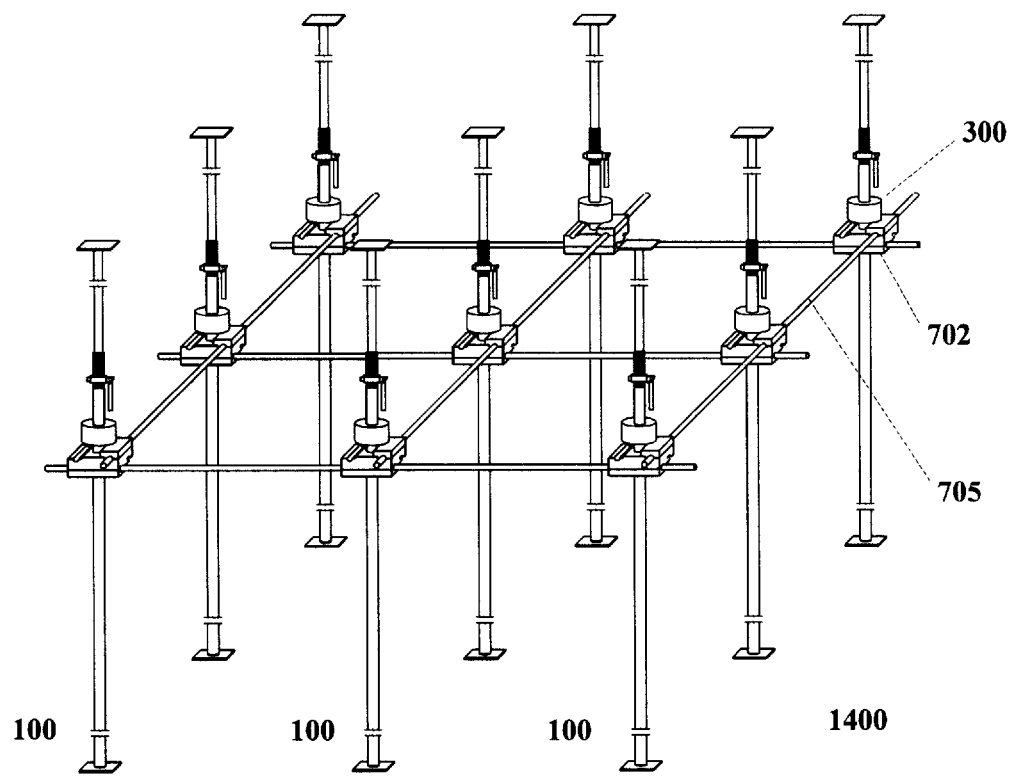
FIG. 9 shows a perspective view of a propping system 400 comprising an array of the telescopic support props 100 fitted with detachable combined signal detection and communication devices 300, lateral restraint member clamping devices 702 and lateral restraint structural members 705.

By using such lateral-restraint member clamping devices 702, a multi-prop support 1400 can be formed by arranging the props 100 in an array as shown in FIG. 9. The clamping devices 702 together with clamping device accessories 704 are attached to the prop 100 for securing horizontally placed bar members (or steel bars), so that every prop 100 provides lateral restraint to its immediate neighboring members as shown in FIG. 9.

A single telescopic prop 100 or a multiple telescopic props support system 1400 can be communicated through to a monitoring device 1002 as shown in FIG. 10. In other words, the monitoring device 1002 monitors one or a plurality of telescopic props 100 mounted with detachable combined signal detection and communication devices 300 (or 502).

Figure 11:
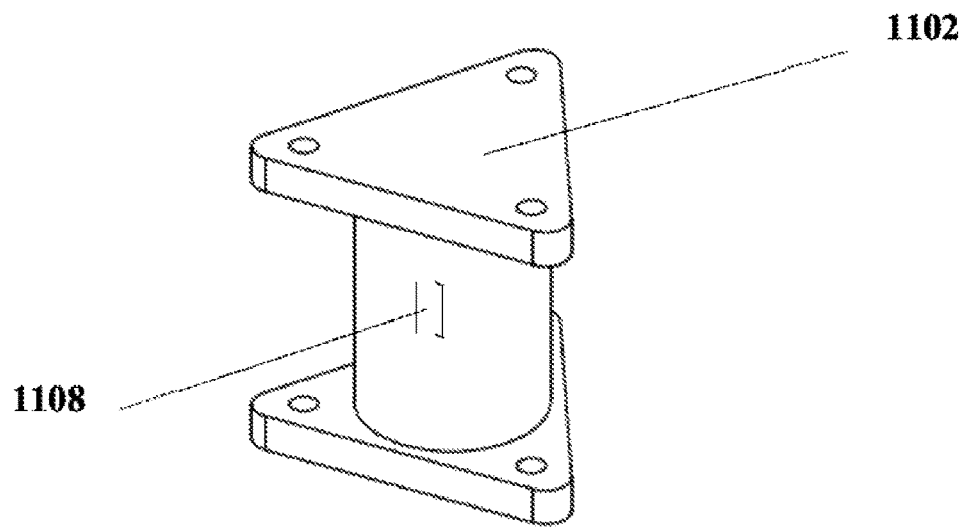
FIG. 11 shows a perspective view of a three-pipe-strut load monitoring pad 1102 with a load sensor 1108 attached thereto of another preferred embodiment of the present invention.
Figure 12:
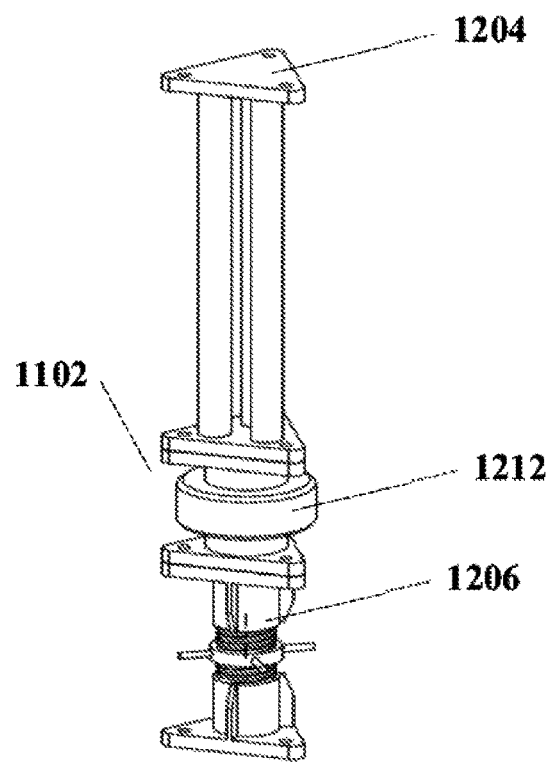
FIG. 12 shows a perspective view of the load monitoring pad 1102 with a combined signal detection and communication device assembly 1212 connected to the three-pipe fixed length strut 1204 and a jackscrew mechanism 1206.

FIG. 11 shows a three-pipe-strut load monitoring pad 1102 with a load sensor 1108 of another embodiment of the present invention. The three-pipe-strut load monitoring pad 1102 is attached to one of the longitudinal ends of the three-pipe fixed length strut 1204, and may be used with an actuator, for example, a jackscrew mechanism 1206 therefor for adjusting the height, with a detachable combined signal detection and communication device 1212 being attached to the pad 1102 as shown in FIG. 12.

Figure 13:
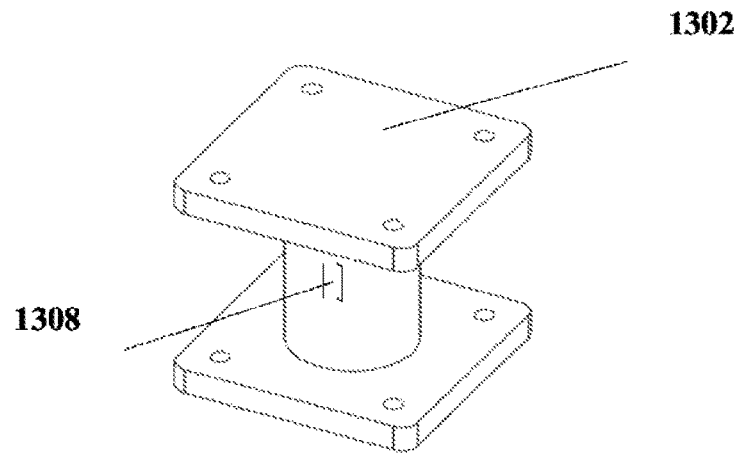
FIG. 13 shows a perspective view of a four-pipe-strut load monitoring pad 1302 with a load sensor 1308 attached thereto of yet another preferred embodiment of the present invention.
Figure 14:
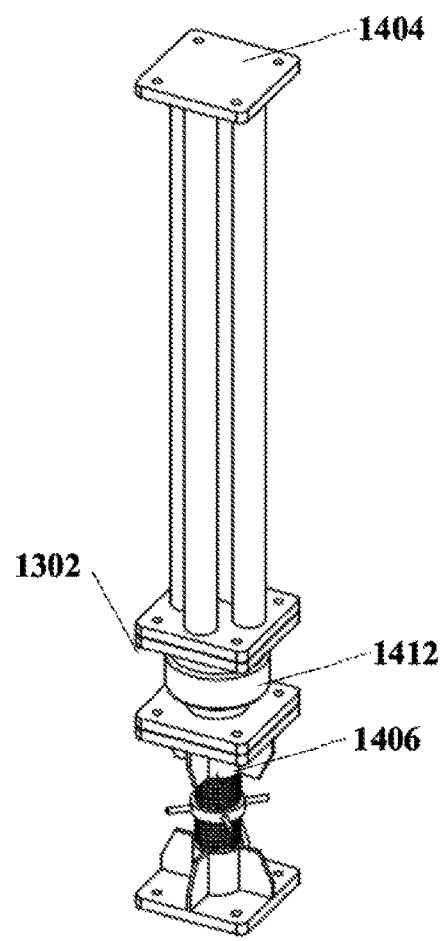
FIG. 14 shows perspective view of a load monitoring pad 1302 with combined signal detection and communication device assembly 1412 connected to the four-pipe fixed length strut 1404 and a jackscrew mechanism 1406.

Similarly, FIG. 13 shows a four-pipe-strut load monitor pad 1302 with a load sensor 1308 of yet another embodiment of the present invention. The four-pipe-strut load monitoring pad 1302 is detachably attached to one of the longitudinal ends of a four-pipe fixed length strut 1404, and may be used with an actuator, for example, a jackscrew mechanism 1406 therefor for adjusting the height, with a detachable combined signal detection and communication device 1412 being attached to the pad 1302 as shown in FIG. 14.

As it can be seen through FIGS. 11 to 14, a load sensor of the present invention can easily be adapted to any single or multi-pipe strut (for example, two-pipe, three-pipe, four-pipe or more).

Figure 15:
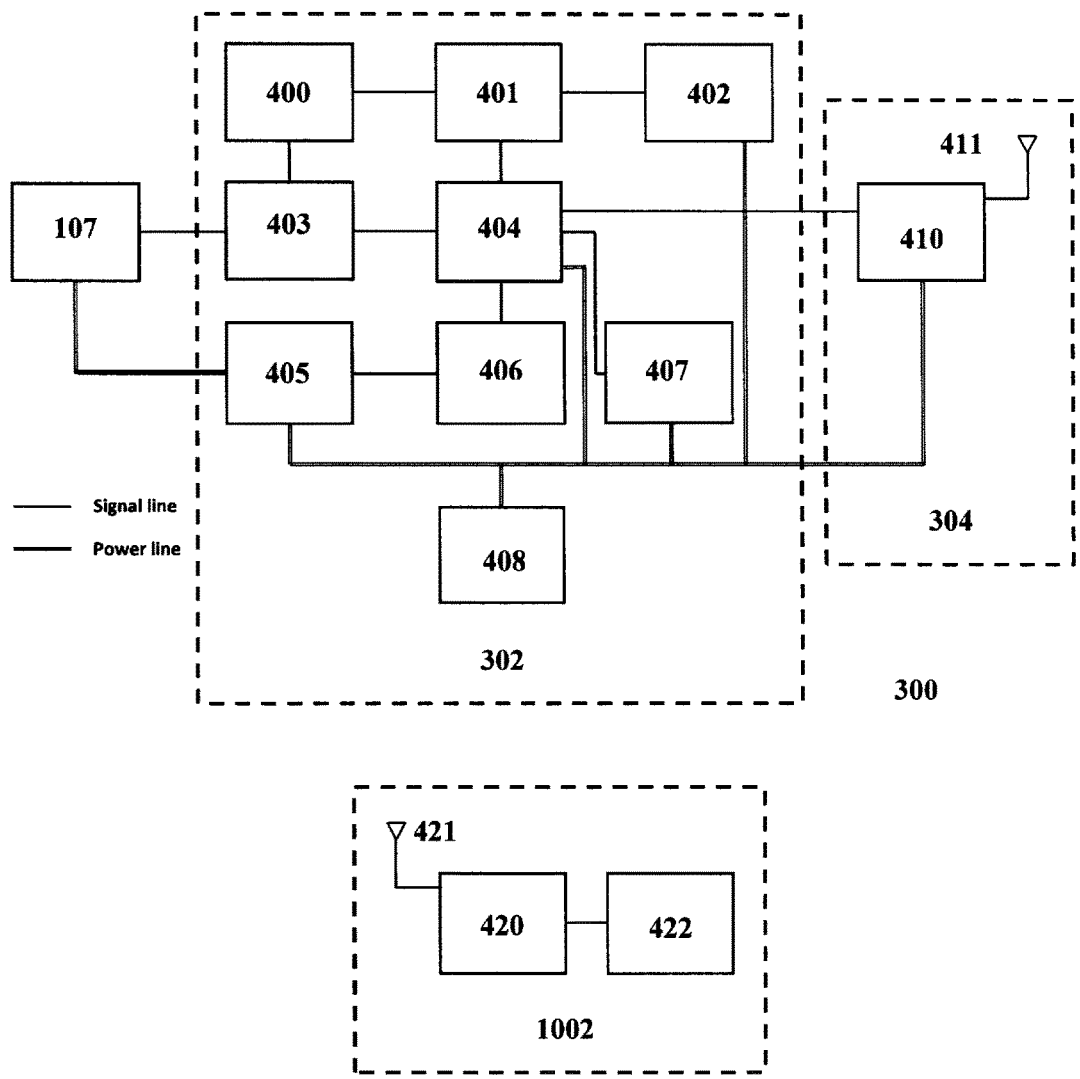
FIG. 15 shows schematic block diagrams of signal detection device 302, communication device 304 and monitoring device 1002 of the preferred embodiment of the present invention.

FIG. 15 shows the schematic block diagrams for the signal detection device 302, the communication device 304 and the monitoring device 1002. The signal detection device 302 of the detachable combined signal detection and communication device 300 receives the command signals and transmits information through the communication device 304 from and to the monitoring device 1002. The signal detection device 302 then executes the received commands to perform specific tasks, such as, for example, to energize the sensor device 107; to receive the electrical signal from the strain gauge type load sensor 108. The signal detection device 302 of a preferred embodiment of the present invention includes a bridge selector 403 for selecting appropriate circuitry prior to amplifying electrical signal from the sensor device 107. The output from such bridge selector is then passed through to an amplifier (or Op-amp) 400 to amplify the electrical signal received from the sensor device 107. Amplified analog signal from the amplifier 400 is then passed to an analog to digital converter (or ADC) 401 to convert the amplified analogue signal to digital signal. For properly and accurately converting such conversion, a reference voltage is provided to ADC 401 from the reference voltage 402. A micro-controller or micro-controller unit 404 receives converted digital signal from ADC 401, and may use some calibration data for correcting or compensating errors. Such calibration values or parameters may be pre-programmed or stored in a memory device, such as Read-Only Memory Device, flash memory or a like (not shown), or may be received from the monitoring device 1002 for accurately calculating the magnitude of the load on the prop 100 and express the magnitude of the load in force units. The value for the magnitude of the load and other relevant information are then transmitted, via the communication device 304, back to the monitoring device 1002 for further processing. Power for providing appropriate operation by the signal detection device 302 is provided through a battery 408. Such battery 408 supplies power for operating the detachable combined signal detection and communication device 300. A voltage regulator 405 provides power to the sensor device 107. A voltage regulator 405 is in communication with a voltage regulator controller 406, which is controlled by the micro-controller unit 404. Thus, when the micro-controller unit 404 receives a command, for example, from the monitoring device 1002 through the transceiver 410 of the detachable communication device 304, the micro-controller unit 404 communicates with the voltage regulator controller 406 for turning on or off the sensor device 107.

The detachable combined signal detection and communication device 300 further comprises a display unit (or digital display unit) 504, in communication with video drive unit 407 for displaying various information. The display unit 504 may be a touch-panel display unit, such that it may be used as input-output device for displaying and receiving commands from a user. The video drive unit 407 may further comprise alarming device driver for audio and/or visual alarm, such as for the micro-controller unit 404 detecting conditions and communicates with the video drive unit 407 for issuing alarms.

The central monitoring device 1002 includes wireless transceiver 420, an antenna 421 and a computing device 422. The central monitoring device 1002 monitors loads on the props 100 in real time. In the event that the force in a prop 100 exceeds a certain pre-set value range, the monitoring device 1002 issues alert signals and further issues alert commands to the detachable signal detection and communication device 300 for issuing alert signals therefrom. Alert signals can be audible noise from beepers or sirens installed inside the combined signal detection device 300, or bright flashing visual lights from LEDs installed thereon.

The invention is not intended to be limited to the preferred versions of the invention described above, but rather is intended to be limited only by the claims set out below. Thus, the invention encompasses all different versions that fall literally or equivalently within the scope of these claims.

The invention claimed is:

1. An adjustable construction or demolition temporary support, comprising:
   a. a first tubular member;
   b. a second tubular member, operably engaging with the first tubular member;
   c. a releasable fastener releasably engaging the first and second tubular members for providing the adjustable temporary support at an adjustable height, wherein the releasable fastener further comprises an actuator for adjusting the height of the adjustable support;
   d. a plurality of load sensor devices attached to a lateral surface of the adjustable support at a same longitudinal distance from one end of the adjustable support, the load sensor devices being equally spaced about a circumference of the adjustable temporary support; and
   e. a signal detection and communication device that is detachably attached to the adjustable support and placed in close proximity to the plurality of load sensor devices, wherein the signal detection and communication device further comprises a sensor for detecting inclination of the adjustable support, and wherein the signal detection and communication device is in communication with the plurality of load sensor devices to measure a load on the adjustable support and sensor for detecting inclination of the adjustable support to measure the inclination of the adjustable support simultaneously.

2. The adjustable construction or demolition temporary support of claim 1, wherein the plurality of the load sensor devices are attached to a lateral inner or outer surface of the adjustable temporary support.

3. The adjustable construction or demolition temporary support of claim 1, wherein the actuator is a jackscrew mechanism.

4. The adjustable construction or demolition temporary support of claim 1, wherein each of the plurality of load sensor devices comprises a strain gauge type load sensor.

5. The adjustable construction or demolition temporary support of claim 4, wherein the adjustable temporary support comprises a corresponding number of flat surfaces for receiving the plurality of load sensor devices.

6. The adjustable construction or demolition temporary support of claim 1, wherein the signal detection and communication device further comprises a wireless transceiver for remotely communicating with a computing device.

7. The adjustable construction or demolition temporary support of claim 1, wherein the signal detection and communication device further comprises a micro-controller unit for monitoring the load on the adjustable temporary support for generating an alarm signal when the load information meets predefined criteria.

8. The adjustable construction or demolition temporary support of claim 7, wherein the signal detection and communication device further comprises a visual display unit being in communication with the micro-controller unit for displaying load information on the adjustable temporary support.

9. The adjustable construction or demolition temporary support of claim 7, wherein the signal detection and communication device further comprises an audio output unit that is in communication with the micro-controller units to provide an audible alarm.

10. The adjustable temporary support of claim 1 wherein the signal detection and communication device extends: about the circumference of the adjustable construction temporary support about which the load sensors are spaced, and b. about the load sensors.

11. The adjustable temporary support of claim 1, wherein the inclination sensor is a microelectromechanical systems (MEMS) integrated circuit.

12. An adjustable construction or demolition temporary support system, comprising:
   a. one or more adjustable supports, each support comprising:
      i. a first tubular member;
      ii. a second tubular member operably engaging with the first tubular member;
      iii. a releasable fastener releasably engaging the first and second tubular members for providing the adjustable support at an adjustable height, wherein the releasable fastener further comprises an actuator for adjusting the height of the adjustable support;
      iv. a plurality of load sensory devices attached to a lateral outer surface of the adjustable construction temporary support at a same longitudinal distance from one end of the adjustable support, the load sensor devices being equally spaced about a circumference of the adjustable support;
      v. a signal detection and communication device that is detachably attached to the adjustable support and placed in close proximity to the plurality of load sensor devices, wherein the signal detection and communication device comprises a sensor for detecting inclination of the adjustable support and wherein the signal detection and communication device is in communication with the plurality of load sensor devices to measure the load on the adjustable support and sensor for detecting inclination of the adjustable support to measure the inclination of the adjustable support simultaneously; and
   b. a monitoring device comprising a wireless transceiver, being in communication with the wireless transceiver of each support.

13. The adjustable temporary support of claim 12, wherein the releasable fastener comprises an actuator configured to urge one of the first and second members lengthwise with respect to the other of the first and second tubular members when manipulated.

14. The adjustable temporary support system of claim 12 wherein the signal detection and communication device extends: about the circumference of the the adjustable construction temporary support about which the load sensors are spaced, and b. about the load sensors.

* * * * *